United States Patent [19]
Kozisek

[11] Patent Number: 5,769,955
[45] Date of Patent: Jun. 23, 1998

[54] PORTABLE SYSTEM FOR LAUNCHING/CATCHING PIPELINE PIGS

[75] Inventor: Louis C. Kozisek, Anchorage, Ak.

[73] Assignee: Atlantic Richfield Company, Los Angeles, Calif.

[21] Appl. No.: 748,449

[22] Filed: Nov. 13, 1996

[51] Int. Cl.[6] .................................. B08B 9/04; B08B 1/00
[52] U.S. Cl. .................... 134/8; 15/104.061; 15/104.062
[58] Field of Search ........................... 134/8; 15/104.061, 15/104.062

[56] References Cited

U.S. PATENT DOCUMENTS

| | | | |
|---|---|---|---|
| 5,208,937 | 5/1993 | Cooper | 15/104.062 |
| 5,219,224 | 6/1993 | Skeels | 405/158 |

OTHER PUBLICATIONS

Pipeline Pigging Technology; J.N.H. Tiratsoo; Gulf Publishing Co., Houston, TX; May, 1989; pp. 41–69 and 262–266.

*Primary Examiner*—Kriellion A. Sanders
*Attorney, Agent, or Firm*—Drude Faulconer

[57] ABSTRACT

A portable launcher/receiver which allows the high capital costs of pigging facilities to be distributed over a plurality of sites. The launcher is transported to the site on a mobile trailer to a docking station where it is aligned with and is releasably connected to an inlet section of a pipeline. A pig is then launched from said launcher/receiver into the pipeline through the inlet section. After the pig has been launched, the launcher/receiver is drained of fluids and is then disconnected and removed from inlet section and can then be moved to another site to launch or receive another pig.

12 Claims, 5 Drawing Sheets

PORTABLE SYSTEM FOR LAUNCHING/CATCHING PIPELINE PIGS

DESCRIPTION

1. Technical Field

The present invention relates to a portable system for launching/catching pipeline pigs (hereinafter referred to collectively only as "launching " or "launcher") and in one of its aspects relates to a pipeline pig launching system which is comprised of a portable launcher which can be moved to and temporarily mated with different docking stations, along a fluid pipeline for launching/catching pigs which travel through the pipeline to perform a designated function therein.

2. Background Art

Most pipelines which carry fluids (e.g. petroleum, natural gas, two-phase fluids, etc.) need to be "pigged" at certain times. This is accomplished by inserting or "launching" a "pig" into the pipeline at a first point and allowing the fluids flowing through the pipeline to push the pig through the pipeline to a second point where it is "caught " and removed from the pipeline. As understood in the art, the term "pig " is used to generically describe any structure or device which freely moves through a pipeline to carry out a particular function.

Normally, pipeline pigs fall into two basic categories, i.e. non-intelligent pigs and intelligent pigs. Non-intelligent pigs are those which perform maintenance or operational functions, e.g. cleaning—such as scraping of solids, etc. from the interior of the pipe—; swabbing—such as removing liquids or gases from the pipeline—: batching—such as separating differents fluids in the pipeline—, etc. Intelligent pigs are those which monitor and convey information about a practicular condition or performance of the pipeline. For a further discussion of pipeline pigs and the various functions they perform, see PIPELINE PIGGING TECHNOLOGY, edited by J. N. H. Tiratsoo, Gulf Publishing Company, Houston, Tex., 1988.

While the ability to pig a pipeline is considered necessary and vital in most successful pipeline operations, unfortunately, this requirement adds substantially to both the installation and the on-going maintenance costs of the pipeline. A substantial portion of these costs result from having to provide permanent launch and/or catcher stations at each of the points along the pipeline where a pig will have to be inserted and/or removed. That is, each launch and/or catcher stations is built into and forms an integral part of the pipeline when the line is initially installed and remains a part of the line regardless of whether or not it is being used.

As will be recognized in this art, providing permanent launchers and/or catchers at each potential launch/catch location is a considerable expense not only in the initial installation costs but also in the on-going maintenance costs since these stations must be maintained even if only used occasionally. Accordingly, it can be seen that a need exists for a launch/receiver system for a pipeline wherein a portable launcher/catcher can be quickly installed and removed at launch/catch point only when its use is required to pig that respective section of a pipeline. Such a system would allow a single universal launcher to be moved from site to site to launch or catch a pig as needed thereby eliminating the need for an expensive permanent launcher/catcher structure at each respective site.

SUMMARY OF THE INVENTION

The present invention provides a portable launcher/receiver which allows the high capital costs of pigging facilities to be distributed over a plurality of sites. The launcher/receiver is adaptable to all kinds of pipelines and can be used to launch/receive all types of pigs, e.g. maintenance, gauging, intelligent pigs, etc., into pipelines having different diameters.

The launcher/receiver is transported to the site on a mobile trailer to a docking station where it is aligned with and is releasably connected to an inlet section of a pipeline. A pig is then launched from said launcher/receiver into the pipeline through the inlet section. After the pig has been launched, the launcher/receiver is drained of fluids and is then disconnected and removed from inlet section and can then be moved to another site to launch or receive another pig.

More specifically, the portable pig launcher/receiver is comprised of a barrel which has a diameter large enough to launch/receive the largest-diameter pig to be handled by the launcher/receiver. The barrel is mounted a table which is moveably mounted on the floor of a mobile trailer. Alignment of the barrel with the inlet section of the pipeline is critical to the successful installation of the launcher/receiver. The barrel is positioned vertically by raising and lowering the floor of the trailer. This is accomplished by using screw or hydraulic jacks or the like which are connected to the floor and which are extendable to engage the ground adjacent the docking station. The barrel is horizontally aligned by a plurality of power cylinders which are connected between the floor and the table at different points around said table. Of course, any of a wide variety of positioning means or combinations thereof can be used to properly aligned one end of the barrel with the pipeline inlet section.

The barrel has a means at one end of said barrel for connecting said barrel to said inlet section while the other end of the barrel is sealed by a releasable closure which can be opened to allow a pig to be loaded into the barrel. The means for connecting said barrel to said inlet section is comprised of a turret which is rotatably mounted on said barrel. At least two transition spools are radially spaced on said turret.

Each of said spools has a conduit section which has a diameter which corresponds to the diameter of a pipeline into which a pig is to be launched/received. Each conduit has a flange at one end which matches the flange on the barrel so that each spool can be releasable connected to the barrel by a releasable coupling, e.g. clamp ring, locking hub, bolts, etc. The other end of each spool has a flange at its other end which is adapted to releasably connected to the inlet section of a the particular pipeline to be serviced when the turret is rotated to align that spool with the inlet section of the pipeline. The flow through the pipeline is generally isolated from the launcher/receiver by valves but this may not be necessary if the lines are sloped accordingly and are de-pressuried.

Once the barrel is positioned and the transition spool is connected to the inlet section of the pipeline, a motive fluid line, which is fluidly connected at one end to the rear end of the barrel, is releasably connected to a supply of pressurized fluid. With a pig in position within the barrel, the motive fluid line is opened and the valves in the inlet section is opened to launch the pig into the pipeline through the inlet section. After the pig is launched, the valves in the inlet section an in the motive fluid lines are closed and the barrel is drained of fluids. The barrel is then disconnected and removed from the inlet section for use at another location.

BRIEF DESCRIPTION OF THE DRAWINGS

The actual construction, operation, and apparent advantages of the present invention will be better understood by

Figure 1:
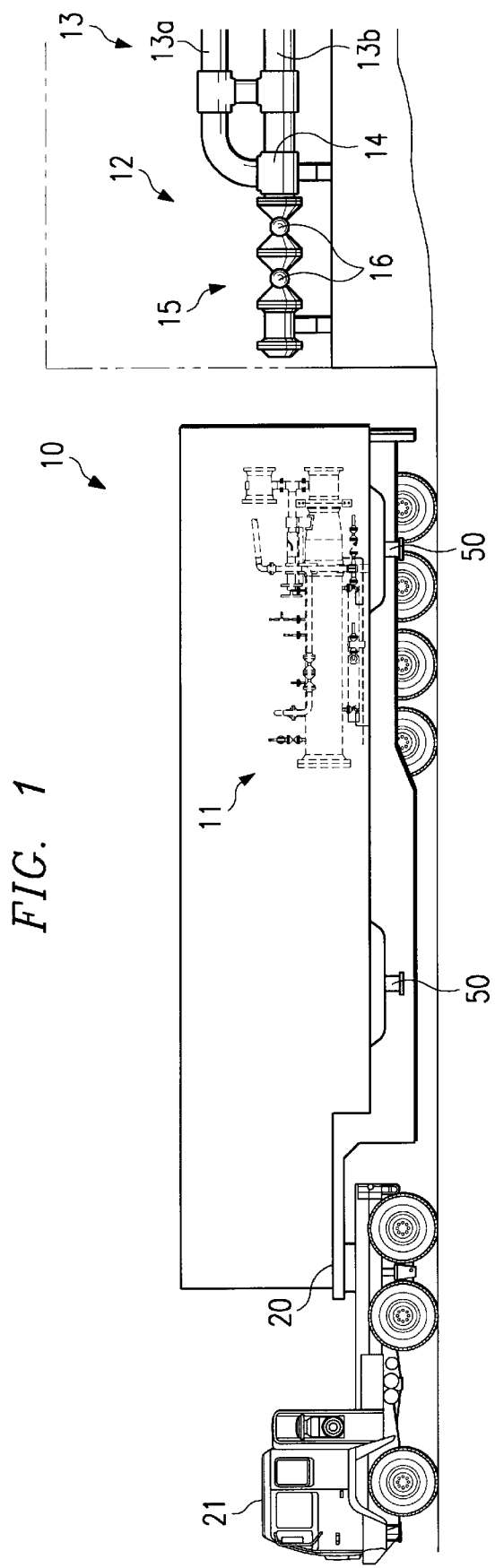
Figure 2:
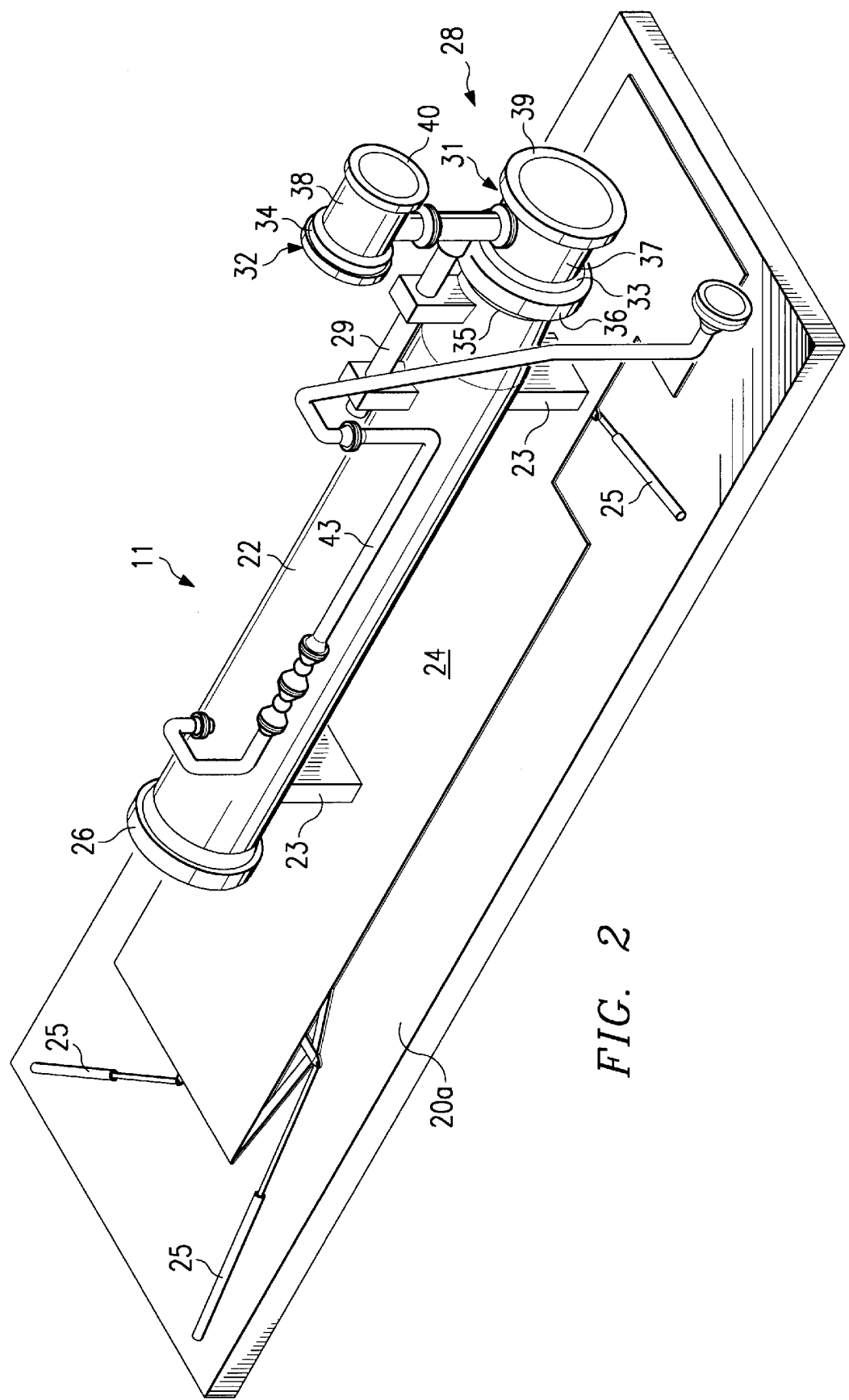
Figure 3:
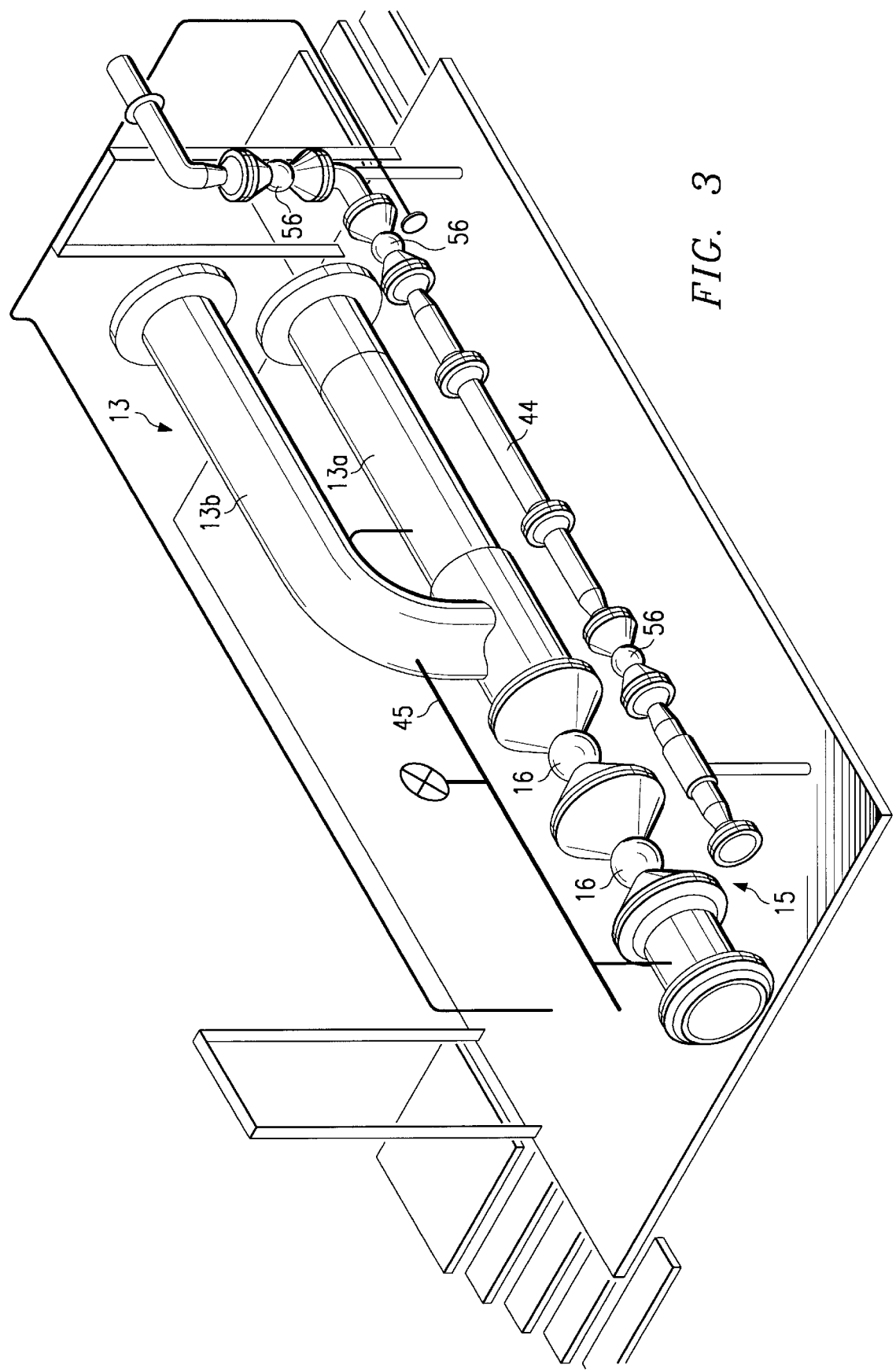
Figure 4:
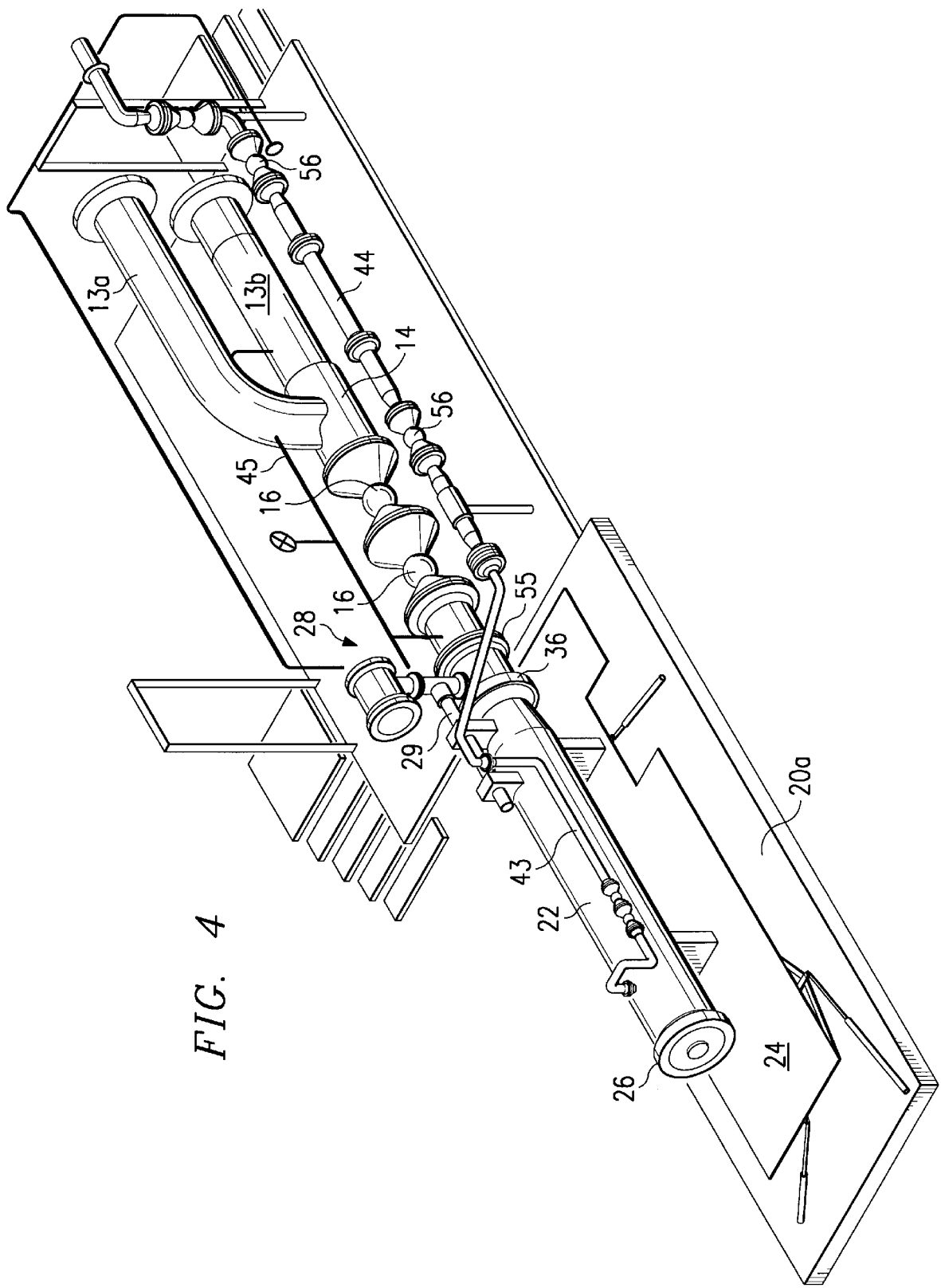
Figure 5:
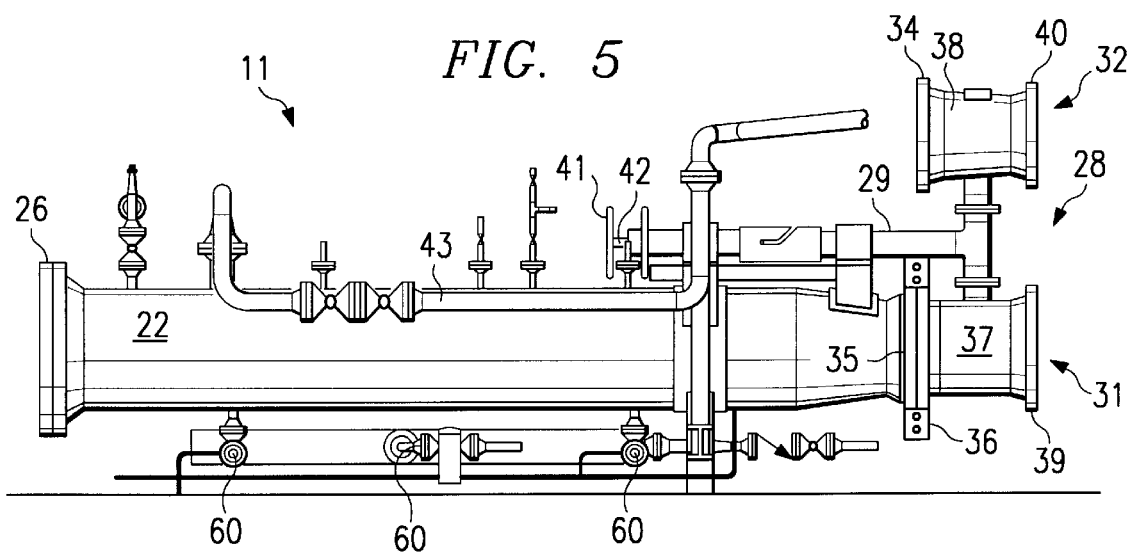

3 referring to the drawings which are not necessarily to scale and in which like numerals refer to like parts and in which:

FIG. 1 is an illustration of the pig launching/catching system of the present invention as the launcher as it is being positioned at a docking station;

FIG. 2 is a perspective view of the launcher of FIG. 1;

FIG. 3 is a perspective view of the docking station of FIG. 1;

FIG. 4 is a perspective view of the launcher and the docking station of FIG. 1 when in a mated position;

FIG. 5 is a side view, partly in section, of the launcher of FIG.1; and

Figure 6:
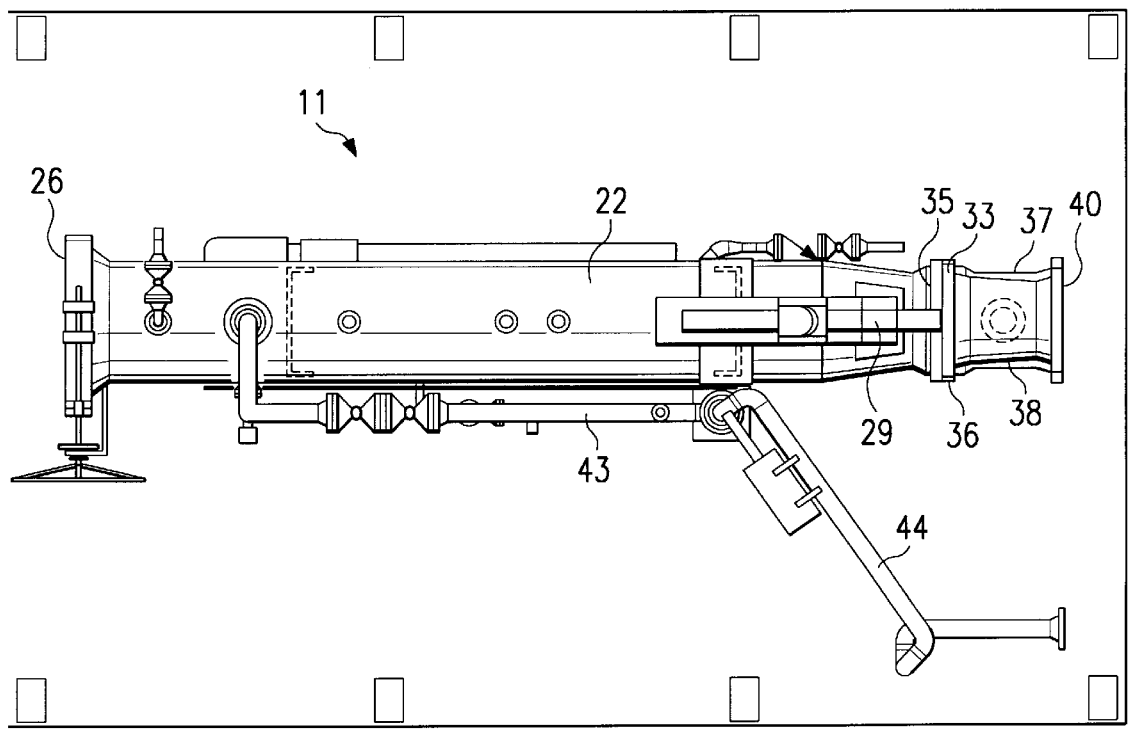

FIG. 6 is a top view, partly in section, of the launcher of FIG. 1.

BEST KNOWN MODE FOR CARRYING OUT INVENTION

Referring now more particularly to the drawings, FIG. 1 discloses a portable launcher system 10 which is comprised of a portable launcher module 11 and a permanent docking station 12. For the sake of expediency, the term "launcher" as used herein is used to collectively describe a structure which is capable of both launching and/or catching a pig depending on the manner in which it is operated in a particular application as will be more fully discussed below.

Docking station 12 is positioned and permanently connected into pipeline 13 usually when the pipeline is initially installed. As will be understood, there will be a plurality of docking stations 12 positioned at strategic locations along pipeline 13 which are spaced to coinside with the launch/catch points required in future piquing operations. It should be understood, that as used herein, "docking station" may have a configuration different from that shown and may consist of valves or blinds but will have an inlet section capable of matins with launcher system 10. Only that portion of pipeline 13 as it relates to station 12 is shown in the drawings. That is, at the point at which a pig is to be launched into the pipeline, the inlet or upstream side 13a and the outlet or downstream side 13b are connected through Tee 14 to form a "loop" through which the fluids in the pipeline flow normally flow. An inlet section 15 including one or more normally-closed valves 16 is also fluidly connected to pipeline 13 through Tee 14 for a purpose to be described below. If a pig is to be caught, the flow through the Tee 14 would be in a reverse direction.

Referring now to FIGS. 1, 2, 5, and 6, launcher module 11 is mounted on a mobile trailer 20 or the like which, in turn, is transported between sites by an over-the-road tractor 21 or the like. Trailer 20 can be open or enclosed without departing from the present invention. Launcher module 11 is comprised of barrel 22 which has an internal diameter large enough to receive the largest pig which is to be launched therefrom. Of course, smaller-diameter pigs can also be launched from launcher 11 as will be explained below. Barrel 22 is mounted on supports 23 which, in turn, are mounted on table 24. While not shown, supports 23 can be fixed or can be of telescopic construction whose components can be extended or retracted (e.q. manually or electrically-operated screw or hydraulic jacks, etc.) to aid in adjusting the vertical height of barrel 22 with relation to table 24 as will be discuss more fully below.

Table 24 is slidably mounted on floor 20a. As shown, three power means 25 are connected between table 24 and floor 20a for adjusting the orientation of the table 24 as will be explained below. Power means can be any means which will move the table, e.g. electrically or hydraulically-driven screw jacks; hydraulic cylinders, etc. . The rear of the barrel is normally closed by a quickrelease closure, e.g. door 26, which provides a good seal under pressure. Such closures are normally supported by adjustable hinges or an adjustable davit (neither shown) and have locking mechanisms (e.q. clamp-ring, bayonet latch (neither shown), etc.) and are well known in this art (e.g. PECO closures distributed by Perry Equipment Corp., Mineral Wells, Tex.; TWD closures distributed by T. D. Williamson, Tulsa, Okla.; etc.).

Positioned at the front of the barrel 22 is a turret 28 which is rotatably mounted on the barrel about axis 29. As shown, turret has two different transition spools 31, 32, each of which has a same-diameter flange 33, 34 at its respective inner end for mating and sealing with flange 35 on the front of barrel 22. Either of flanges 33, 34 can be sealingly coupled to flange 35 by a quick-release connector, e.g. clamp ring 36 (FIG. 5) or the like. The conduit portions 37, 38 of spools 31, 32, respectively, however, have different internal diameters which match the diameters of the respective pipelines with which each of the spools are to be used. The flanges 39, 40 at the other end of the spools 31, 32, respectively, are differently sized so as to be connected to different-sized pipelines.

As will be understood, either of conduits 37, 38 is adapted to be connected at one end to the front of barrel 22 while being adapted to mate with a different diameter pipeline (e.g. 24 inch and 20 inch, respectively) at its other end. This allows launcher module 11 to handle pigs for the different-sized pipelines. While only two transition spools are shown, it should be recognized that turret 28 could include additional spools (e.g. 4 spools set 90° apart) to allow a single launcher 11 to service a equal number of different diameter-sized pipelines (e.g. gathering lines, main pipeline, etc.). This is an important ecomonical consideration in managing the overall costs involved in pipeline pigging operations.

To change spools, clamp ring 36 is opened and turret 28 is rotated about axis 29 by means of handwheel 41 which is mounted on rotator shaft 42 (FIG. 5) which is geared (not shown) with axis 29 to move the heavy spools. As the turret 28 is rotated, flange 33 of spool 31 is disengaged with flange 35 on barrel 22 is replaced by flange 34 on spool 32. Clamp ring 36 is then closed and launcher is now ready to be mated with a pipeline having the same internal diameter as that of conduit section 38. It can be seen that by this simple maneuver, launcher module 11 is quickly and easily adapted to launch/catch pigs into/from pipelines having different internal diameters.

One end of motive fluid line 43 is connected to and opens into barrel 22 near the rear thereof for a purpose which will become obvious below. The other end of motive fluid line 43 is adapted to be releasably connected to supply line 44 on docking station 12 when launcher 11 is in an operable position (FIG. 4). Motive fluid line 44 is of a relatively-small diameter and is effectively flexible thereby eliminating the need for any separate positioning mechanisms. The equalizing line 45 (see FIG. 4) is also connected and opened.

In operation, as seen in FIG. 1, the trailer 20 is backed up to docking station 12 where launcher module 11 is roughly aligned in a horizontal position with relation to inlet section 15 of the pipeline. Built-in jacks 50 on trailer 20 are lowered to lift the trailer 20 off the ground to stabilize the trailer and to vertically position the floor of the trailer approximately level with the base of station 12. Once this is accomplished, tractor 21 can be unhitched and moved.

Inlet section 15 on pipeline 13 is readied after checking to insure valves 16 are closed. Power means 25 (e.g.

electrically-operated jacks, hydraulic cylinders, etc.) are then actuated to make the final alignment between barrel 22 of launcher module 11 and inlet conduit 15 of docking station 12. The power means 25 on the sides of table 24 adjust to move the table sidewise while the means on the end move the table forward toward the docking station. Once alignment is accomplished and flange 33 or 34 is in substantial engagement with flange 35 on inlet section 15, the two are connected and fluidly sealed together by a quick-release coupling, e.g. clamp ring 55 (FIG. 4). Motive fluid line 43 is connected to supply line 44 on docking station 12 and equilizing 45 line is connected between the launcher and the docking station.

Closure 26 on the rear of barrel 22 is opened. The appropriate pig (not shown) is then loaded into barrel 22 much in the same way as pigs are normally loaded into prior-art launchers of this type. That is, a winch or the like (not shown) lifts the relatively heavy pig (e.g. 100 to 4500 pounds) into an elongated tray or the like (now shown). The tray is sized in relation to the size of the pig being used whereby the pig will be effectively centered within barrel 22 when the tray and pig are slid into the barrel. The tray is moved all the way into the barrel whereby the front of the pig is received into the conduit section of the respective transition spool being used.

Closure 26 is closed and sealed. Next, valves 16 in inlet section 15 are opened as are all of the valves 56 in motive fluid supply lines 44, line 43. A gas (e.g. nitrogen) or other pressure fluid is supplied through supply line 44. This pressurized fluid flows in behind the pig and "launches" it through inlet section 16 into the outlet or downstream side 13b of pipeline 13. Valves 56 in the supply line 44 and valves 16 in inlet section 15 are then closed whereby the pipeline fluids now will flow from inlet side 13a, through Tee 14, and out through outlet 13b to push the pig along the pipeline. With valves 16 closed, the launcher 11 is now isolated from the flow in the pipeline and can now be removed from the docking station.

To disconnect and remove the portable launcher 11 from the docking station, the above procedure is substantially reversed. After valves 16 are closed, the pressure in the launcher is released and any liquid therein is drained through drains 60, FIG. 5. Next, clamp ring 55 is released and the power means 25 are actuated to move the table 24 back on floor 20a. Jacks 50 are retracted so that the wheels on trailer 20 again encase the around and the launcher 11 is now ready to move to a new docking station 12 to carrying out a new pigging operation.

Where launcher 11 is to be used as a catcher, the flow through the launcher is in a direction reverse to that described above. It can be seen that the momentum of the Pig will carry it into barrel 22 of launcher and will be trapped therein valves 16 are then closed so the fluids in the pipeline will now by-pass the launcher whereby the launcher can be drained and removed from inlet section 15 of pipe line 13. The launcher is then opened and the pig is retrieved as will be understood in the art.

What is claimed is:

1. A portable launcher/catcher system for launching/receiving a pipeline pig, said system comprising:
   a docking station having an inlet section connected into a pipeline,
   a portable pig launcher/receiver comprising:
      a barrel having a diameter large enough to receive the largest-diameter pig to be handled by said launcher/receiver; and
      means at one end of said barrel for releasably connecting said barrel to said inlet section of said docking station whereby a pipeline pig can be launched/received through said pipeline, said releasable connecting means comprising:
         a turret rotatably mounted on said barrel, and
         at least two transition spools radially spaced on said turret, each of said spools having a different diameter and each having means at one of its end adapted to connect said spool to said one end of said barrel and having a means at its other end adapted to connect said spool to a respective pipeline having an equal diameter when said turret is rotated to aligned said spool with a respective pipeline; and
         releasable closure means at the other end of said barrel for opening and closing said other end.

2. The portable launcher/catcher system of claim 1 including:
   a mobile trailer having a floor;
   a table movably mounted on said floor;
   means for mounting said barrel of said launcher/receiver on said table;
   means for raising and lowering said floor to vertically alien said one end of said barrel with said inlet section of said docking station; and
   means for moving said table with relation to said floor to horizontally align said one end of said barrel with said inlet section.

3. The portable launcher/catcher system of claim 2 wherein said means for raising and lowering said floor includes:
   jacks connected to said floor and extendable to engage the around adjacent said docking station.

4. The portable launcher/catcher system of claim 2 wherein said means for horizontally aligning said barrel includes:
   power means connected between said floor and said table.

5. The portable launcher/catcher system of claim 4 wherein said power means comprise:
   a plurality of power cylinders connected between said floor and said table wherein each of said cylinders is positioned at a different point around said table.

6. The portable launcher/catcher system of claim 5 including:
   a motive fluid line fluidly connected at one end to said barrel near said other end of said barrel and adapted to be releasably connected to its other end to a supply of pressurized fluid.

7. A portable launcher/catcher comprising:
   a barrel having a diameter large enough to receive the largest-diameter pig to be handled by said launcher/receiver; and
   means at one end of said barrel adapted for connecting said barrel to an inlet section of a pipeline, said means comprising:
      a turret rotatably mounted on said barrel, and
      at least two transition spools radially spaced on said turret, each of said spools having a different diameter and having means at one end adapted to connect said spool to said one end of said barrel and having a means at its other end adapted to connect said spool to a respective pipeline having an equal diameter when said turret is rotated to aligned one of said spools with a respective pipeline; and
   releasable closure means at the other end of said barrel for opening and closing said other end.

8. The portable launcher/receiver of claim 7 including:

a mobile trailer having a floor;

a table movably mounted on said floor;

means for mounting said barrel of said launcher/receiver on said table;

means for raising and lowering said floor to vertically align said one end of said barrel with said inlet section of said docking station; and means for moving said table with relation to said floor to horizontally align said one end of said barrel with said inlet section.

9. The portable launcher/catcher of claim 8 wherein said means for raising and lowering said floor includes:

jacks connected to said floor and extendable to engage the around adjacent said docking station.

10. The portable launcher/catcher of claim 9 wherein said means for horizontally aligning said barrel includes:

Power means connected between said floor and said table.

11. The portable launcher/catcher of claim 10 wherein said power means comprise:

a plurality of power cylinders connected between said floor and said table wherein each of said cylinders is positioned at a different point around said table.

12. The portable launcher/catcher of claim 11 including:

a motive fluid line fluidly connected at one end to said barrel near said other end of said barrel and adapted to be releasably connected to its other end to a supply of pressurized fluid.

\* \* \* \* \*